United States Patent [19]

Faris

[11] 4,242,016

[45] Dec. 30, 1980

[54] APPARATUS FOR GUIDING A HAND-HELD ELECTRIC DRILL

[76] Inventor: Bernard L. Faris, R.F.D. 1, Box 166, Glen Allen, Va. 23060

[21] Appl. No.: 727

[22] Filed: Jan. 3, 1979

[51] Int. Cl.³ .............................................. B23B 49/00

[52] U.S. Cl. ........................................ 408/14; 408/16; 408/112; 408/712

[58] Field of Search ..................... 408/14, 87, 95, 100, 408/107, 108, 110, 111, 112, 16, 712, 75

[56] References Cited

U.S. PATENT DOCUMENTS

| | | | |
|---|---|---|---|
| 833,001 | 10/1906 | Press | 408/112 |
| 1,895,990 | 1/1933 | Harcharick | 408/112 X |
| 2,367,582 | 1/1945 | Honyoust | 408/76 |
| 2,454,372 | 11/1948 | Billeter | 408/112 X |
| 2,849,900 | 9/1958 | Heidtman, Jr. | 408/112 |
| 2,997,900 | 8/1961 | Pugsley | 408/95 |
| 3,791,755 | 2/1974 | Warren | 408/76 |
| 3,838,935 | 10/1974 | Boyajian | 408/75 |
| 3,874,810 | 4/1975 | Russell | 408/14 |
| 4,082,474 | 4/1978 | Stiger | 408/110 |

*Primary Examiner*—Z. R. Bilinsky
*Attorney, Agent, or Firm*—Norman B. Rainer

[57] ABSTRACT

An apparatus is provided for use in conjunction with an electric drill to achieve precision drilling of holes at various desired angles in a workpiece. The apparatus comprises a base member which supports two pivoted, spring-containing columns bridged by a sliding carriage member carrying a spindle and chuck. The base member fits into an underlying anchoring means which assures accurate placement of the drill and steadiness of support. Hole indicator means, used in conjunction with said anchoring means enable precise location of hole sites on the workpiece.

7 Claims, 10 Drawing Figures

APPARATUS FOR GUIDING A HAND-HELD ELECTRIC DRILL

BACKGROUND OF THE INVENTION

1. Field of the Invention

This invention relates to apparatus to be used in conjunction with a conventional electric drill for the precision drilling of holes in a workpiece.

2. Discussion of the Prior Art

Hand-held electric drills are versatile tools which find widespread utilization in various applications. Such drills are generally comprised of a high-speed motor enclosed within a housing having a gripping handle, and a chuck mounted on the motor shaft for engaging drill bits of various sizes. Although the portability and convenient handling of the hand-held electric drill are advantageous features, such features are not conducive to the precision or replicate drilling of holes as may be secured in factory operations using large drill presses.

Numerous auxiliary devices have heretofore been disclosed which seek to adapt the electric drill to improved precision of operation. In certain types of such auxiliary devices, the drill is mounted on a yoke-like carriage which slidably engages two opposed upright support columns attached to a base plate having an aperture centered beneath the drill bit. The auxiliary device of U.S. Pat. No. 2,997,900 to Pugsley further discloses a double base which functions as a vise for holding cylindrical workpieces such as pipes, and utilizes coil springs on said upright columns to provide an upward restoring force for the drill-carriage assembly. Although the device permits acceptance of drill bits of various sizes, the necessary adjustment for different length bits and hole depths causes variation in spring tension. The Pugsley device improves the precision of use of an electric drill but is limited to the drilling of holes perpendicular to the face of the workpiece, and further requires careful attachment of the drill to the carriage to ensure vertical alignment. The effort needed for such alignment causes the electric drill to lose its advantage of facile adaptation to varied tasks.

U.S. Pat. No. 3,874,810 to Russell discloses a drill guide apparatus generally similar to that of Pugsley except that a spindle is centered within the carriage member to achieve vertical alignment of an electric drill which attaches to said spindle. The upright columns of the Russell apparatus are adapted to pass adjustably and independently through a base plate to abuting engagement with an underlying workpiece. Such design is not compatible with the use of restoring springs, and does not afford sufficiently secure attachment of the apparatus to the workpiece for the precise drilling of holes.

It is an object of the present invention to provide a device adapted for use with a hand-held electric drill for improving the precision with which holes can be drilled in a workpiece, and containing springs which aid in restoring said electric drill to its position prior to the drilling of a hole in a workpiece.

It is a further object to provide a device of the aforementioned nature which can accommodate drill bits of various sizes and produce holes of various depths without significant variation of the restoring force provided by said springs.

It is another object to provide a device of the aforementioned nature which can be securely attached to the workpiece.

It is a still further object of this invention to provide a device of the aforementioned nature capable of drilling holes in a workpiece at angles between 45° and 90° with respect to the surface of said workpiece.

These objects and other objects and advantages of the invention will be apparent from the following description.

SUMMARY OF THE INVENTION

The above and other beneficial objects and advantages are accomplished in accordance with the present invention by the provision of an improved auxiliary device for supporting and positioning a hand-held electric drill. Said device is comprised of a base member, two opposed columns pivotably attached to said base member, a carriage which slideably engages said columns and contains a spindle and chuck attached thereto, and anchoring means adapted for afixment to a workpiece and engagement with the underside of said base member. The device has a plane of symmetry which includes the axis of said spindle and perpendicularly intersects the line between the centers of said columns.

The base member contains an aperture generally centered on a line representing the extension of the axis of said spindle. The underside of said base member comprises a flat surface and spaced protuberances depending therefrom. The upper surface of said base member is provided with abutment means adapted to engage with said columns adjacent the lower extremities thereof. Said base member further provides means for the pivotal attachment of the lowermost ends of said columns.

Each column is comprised of an upper cylindrical tube member, a lower cylindrical tube member which engages said upper tube member in telescoping manner, and a coil spring and compressing means therefor confined within said tube members. Means are provided adjacent the upper end of said upper tube and the lower end of said lower tube to facilitate the confinement of said spring and compressing means. Each column is supported by pedestal means adjacent the lower end of said lower tube. Said pedestal means, which may be an integral extension of said lower tube, comprises means for pivotal engagement with said base member, means for abuting engagement with said abutment means, and optionally, means for confining said spring and compressing means. In preferred embodiments, angle locking means may be provided in association with said pedestal means to accurately position the angular relationship of said columns with respect to said base member.

The carriage is a yoke-like structure slideably attached to the upper tube members of said columns. Locking means enable said carriage to be fastened at any desired height along said upper tube members. A spindle, journaled to the center of said carriage in parallel alignment with said columns, supports a downwardly directed adjustable chuck capable of holding drill bits of various diameters. The upper extremity of said spindle is adapted to be gripped by the chuck of an electric drill. In preferred embodiments, the carriage also comprises depth stop means which coacts with a surface associated with said columns at the bases thereof to limit the extent of traverse of the carriage along said columns.

The anchoring means, having a flat upper surface, is provided with openings such as holes or depressions for receiving in close-fitting engagement the protuberances of said base member. A central aperture in said anchoring means is positioned and dimensioned such that, when engaged with said base member, the central apertures of both components will be in substantially congruent relationship. Attachment means are provided in association with said anchoring means whereby said anchoring means may be adjustably clamped to a workpiece. Hole indicator means may be provided in association with said anchor means whereby the exact position may be determined for clamping said anchoring means to a workpiece.

BRIEF DESCRIPTION OF THE DRAWINGS

In the accompanying drawing forming a part of this specification and in which similar numerals of reference indicate corresponding parts in all the figures of the drawing.

DESCRIPTION OF THE PREFERRED EMBODIMENTS

Figure 1:
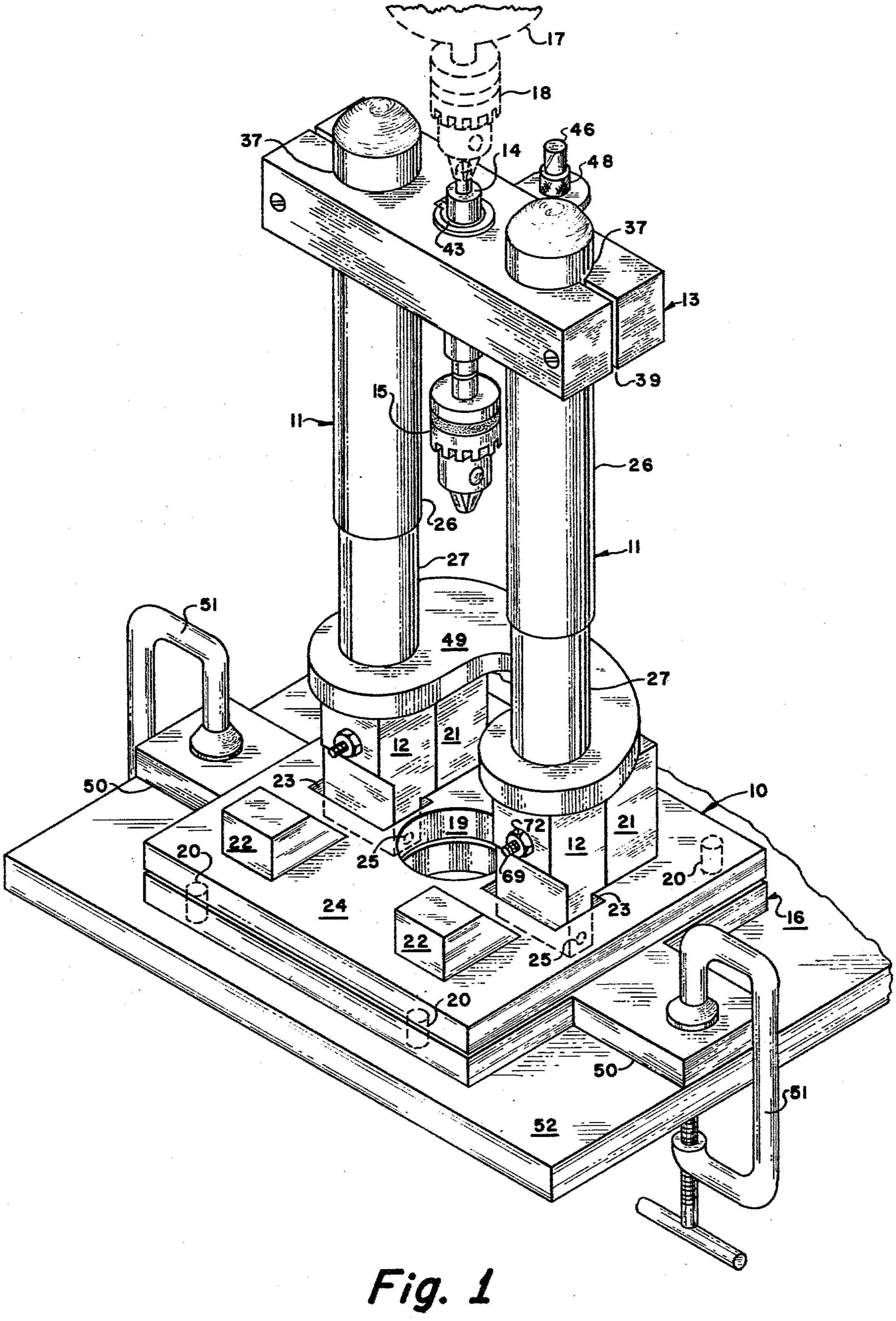
FIG. 1 is a perspective view of an embodiment of the apparatus in its upright 90° position engaged with a flat workpiece.

Referring to FIG. 1, an apparatus of the present invention is shown comprising a base member 10, two opposed columns 11 mounted atop pedestal means 12 which extend downwardly through openings 23 in said base member for pivotal attachment adjacent the underside thereof, a carriage 13 slideably engaging said columns and containing a spindle 14 with chuck 15 threadably attached thereto, and anchoring means 16 adapted for afixment to a flat workpiece 52. A hand-held electric drill 17 and its chuck 18, neither a part of the present invention, are shown in phantom outline in the position they would occupy when utilized with the auxiliary drill positioning apparatus of this invention.

The base member 10 contains an aperture 19 generally centered on a line representing the extension of the axis of spindle 14. Cylindrical stub protuberances 20 are threadably engaged with the substantially flat underside of said base member at sites symmetrically disposed about aperture 19. Paired vertical abutment means 21 and angled abutment means 22, affixed to or integral with upper surface 24 of base member 10, are disposed in opposed relationship about pedestal means 12. A pivot pin 25, held by base member 10 engages the lower terminus of pedestal means 12 for pivotal movement in a plane perpendicular to said base member. Although shown as being positioned within base member 10, said pivot pin 25 may in other embodiments depend beneath the lower surface of said base member in attachment therewith. In such modifications, the lower terminus of pedestal means 12 becomes another protuberance which is to be accommodated by anchoring means 16, as will be hereinafter described.

Figure 4:
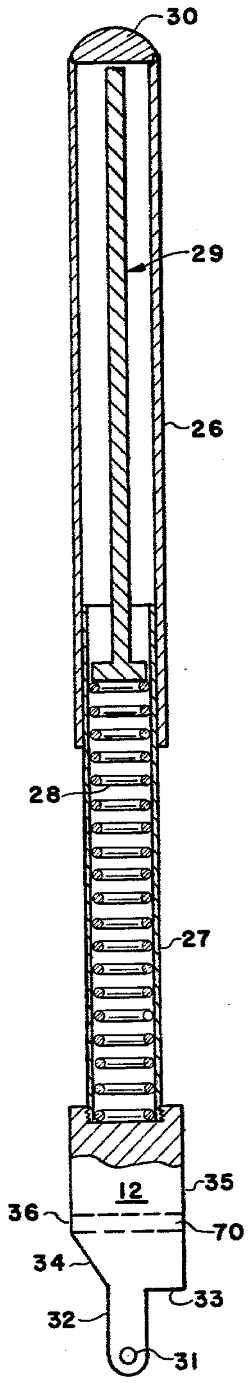
FIG. 4 is a vertical sectional view of a column taken along the lines 4—4 of FIG. 2.

Each column 11 is comprised of upper cylindrical tube 26 in telescoping engagement with lower cylindrical tube 27, and a confined coil spring 28, as shown more clearly in FIG. 4. A plunger 29 extends between closure means 30 on tube 26, and the top of spring 28. Although shown in a specific configuration, plunger 29 may have different forms capable of providing the same function of bearing against the free end of said spring at a fixed distance from the extremity of the opposing tube. The relative positions of the spring and plunger may in some embodiments be reversed. The lowermost terminus of lower tube 27 is shown in FIG. 4 to be threadably engaged with pedestal means 12. Other equivalent modes of joinder of tube 27 with pedestal means 12 are contemplated as being within the purview of this invention. It is to be noted that, in the specific embodiment of FIG. 4, the top of pedestal means 12 also functions as the means for retaining spring 28 in tube 27.

Figure 3:
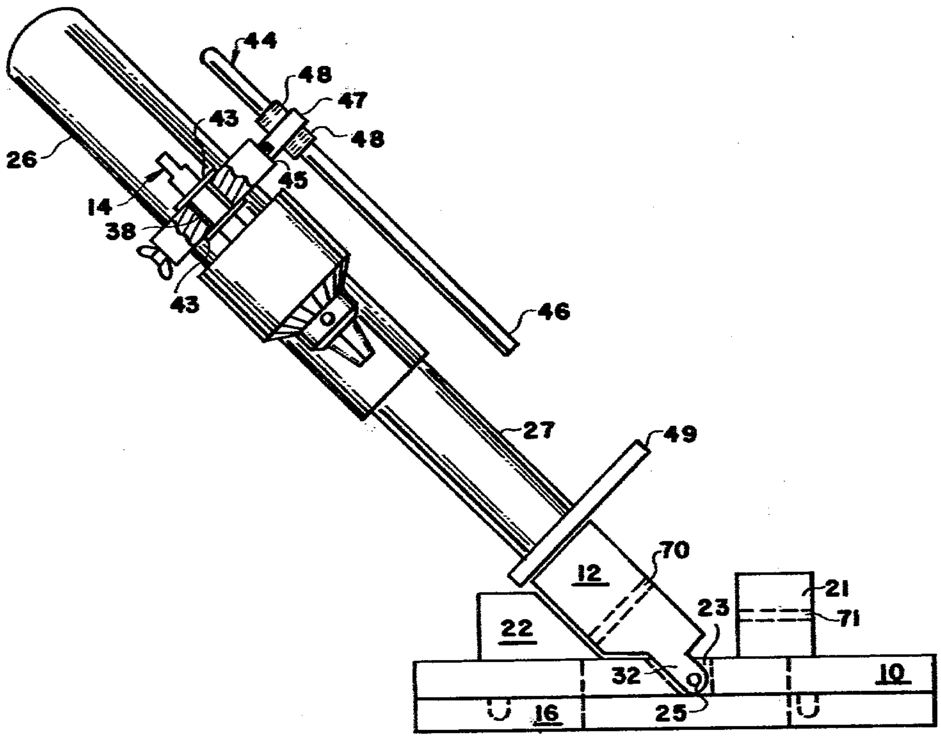
FIG. 3 is a sectional side view of the embodiment of FIG. 1 adjusted to a 45° position.

The lower portion of pedestal means 12 is provided with a cylindrical bore 31 adapted to accept pivot pin 25 in close-fitting engagement therewith. The illustrated embodiment of pedestal means 12 shows bore 31 to be positioned adjacent the extremity of a lever-like arm 32. Alternative equivalent designs may however be utilized to achieve the desired pivotal attachment of pedestal means 12 to base member 10. The specific configuration of pedestal means shown in FIGS. 1, 3 and 4 is provided with abutment surfaces 33 and 34 adapted to meet the upper face of base member 10 in the 90° and 45° positions of the columns respectively and abutment surfaces 35 and 36 adapted to meet abutment means 21 and 22 respectively. Such engagement of the preferred pedestal means with two different surfaces in either the 45° or 90° position provides unusually high structural stability. Other configurations of pedestal means may however be employed involving alternative methods for achieving stable engagement with abutment means 21 and 22. Because the apparatus will be most frequently used for the drilling of 90° holes, a supplementary bolt 69, which passes through aligned channels 70 and 71 in said pedestal means and abutment means 21 respectively and engages with a tightening nut 72, provides greater sturdiness in the 90° position, and can be removed for angular drilling.

Figure 2:
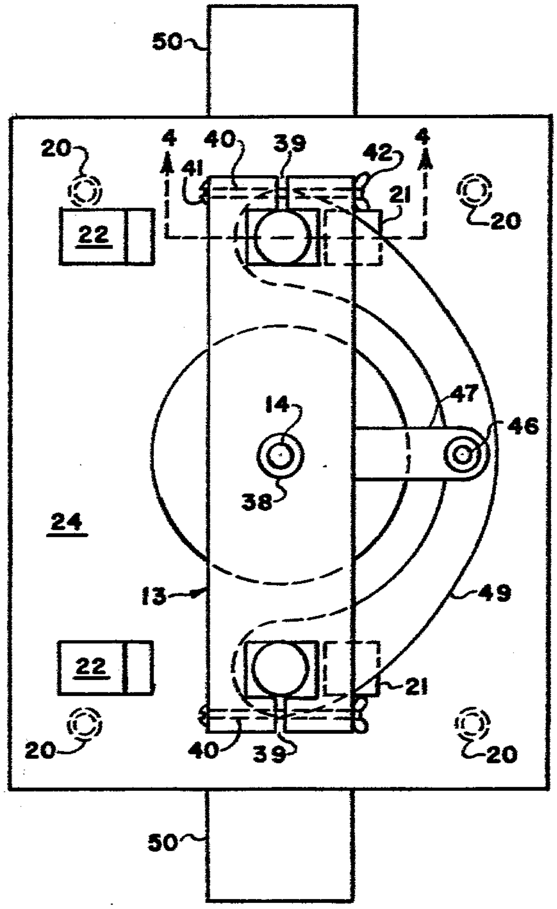
FIG. 2 is a top view of the embodiment of FIG. 1.

The carriage 13 illustrated in the embodiment of FIGS. 1, 2 and 3 contains paired identical tubular channels 37 disposed adjacent each extremity of said carriage and equally spaced from and parallel to center bore 38. Each channel 37 communicates with an open slot 39 bridged by compressing means such as threaded bolt 40 having head 41 and winged nut 42 whereby compression of said slot 39 causes channels 37 to constrict and firmly grip upper tube 26. In this manner, the carriage can be adjustably positioned along tube 26 in a manner preserving the vertical alignment of center bore 38. Other specific locking means may however be utilized in causing temporary afixment of the carriage to upper tube 26.

A spindle 14 is journaled within center bore 38, being maintained within said bore by split retaining rings 43 seated in annular grooves in said spindle positioned above and below carriage 13. The upper terminus of spindle 14 is fashioned to be gripped by the chuck of a conventional hand-held electric drill. The lower terminus of said spindle threadably engages a conventional adjustable chuck 15.

A depth stop means 44, as shown in FIG. 3, is associated with the rear face 45 of carriage 3. Said stop means is comprised of threaded rod 46, holding bracket 47, and knurled positioning nuts 48. The lowermost extremity of rod 46 is adapted to meet buttplate 49 which spans columns 11 at the bases thereof. It should be noted that, in the 90° position of the apparatus, the lower surface of buttplate 49 lies against the upper surface of abutment means 21, thereby providing further structural support to the apparatus.

Figure 5:
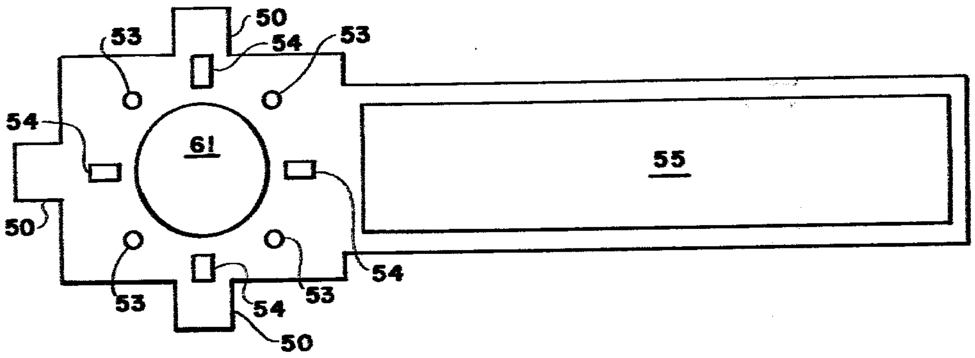
FIG. 5 is a plan view on a reduced scale of an alternative embodiment of anchoring means useful in the apparatus of FIG. 1.

The embodiment of anchoring means 16 shown in FIGS. 1, 2 and 3 is an integral flat structure having flat upper and lower surfaces and a central aperture 61 of equal diameter to aperture 19 of base member 10. Outwardly directed tabs 50 function as attachment means to facilitate the clamping of said anchoring means by C-clamps 51 or equivalent means to a workpiece 52. Openings 53 are provided in anchoring means 16 to accommodate the protuberances below base member 10. In the particular embodiment of anchoring means shown in FIG. 5, additional openings 54 are provided to accommodate the lower arms 32 of pedestal means 12. Because the openings 53 and 54 are arranged in square patterns, base member 10 can engage with the anchoring means in four different positions at 90° intervals about central aperture 61. The embodiment of anchoring means of FIG. 5 also contains an elongated slot 55 which serves to position a hole indicator means at a precise distance with respect to the center of aperture 61.

Figure 6:
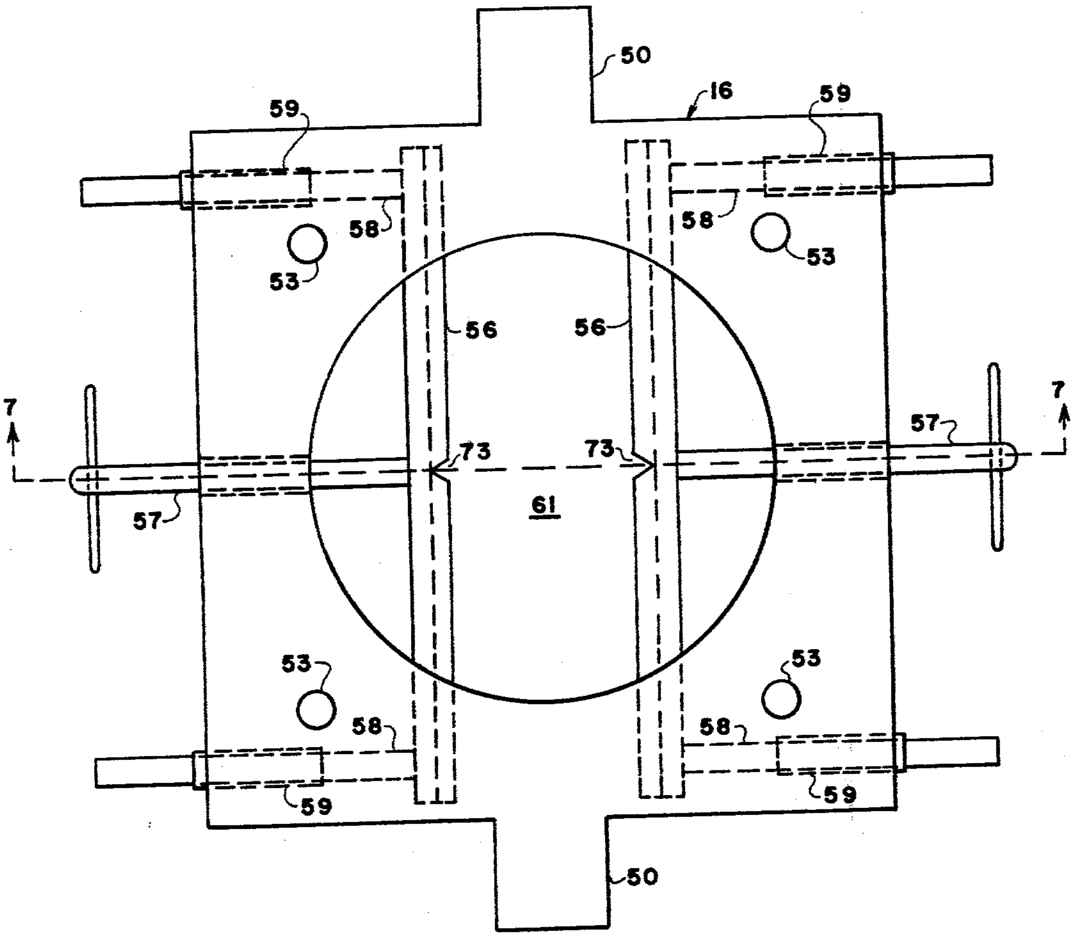
FIG. 6 is a plan view on an enlarged scale of another alternative embodiment of anchoring means useful in the apparatus of FIG. 1.
Figure 7:
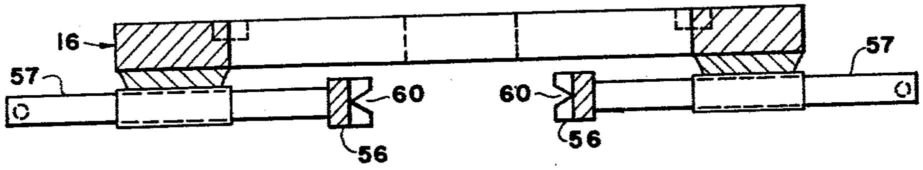
FIG. 7 is a sectional view taken along the lines 7—7 of FIG. 6.

The embodiment of anchoring means shown in FIGS. 6 and 7 provides attachment means in the form of opposed holding beams 56 which are urged into engagement with a workpiece by threaded turnkey 57. Parallel alignment of beams 56 is achieved by means of slide rods 58 and associated collars 59. V-notches 60 running the length of beams 56 facilitate the gripping of cylindrical workpieces such as pipes, rods and dowels in a horizontal disposition. Accessory blocks having V-notches can be inserted between beams 56 to adapt to round workpieces of various diameters. Opposed vertical notches 73 in beams 56 permit the gripping of cylindrical workpieces in vertical disposition for the drilling of holes in the ends thereof.

Figure 8:
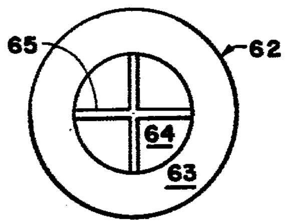
FIG. 8 is a plan view of an embodiment of hole indicator means useful in conjunction with the anchoring means of the apparatus of the present invention.
Figure 9:
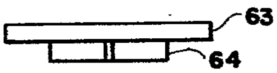
FIG. 9 is a side view of the hole indicator means of FIG. 8.

FIGS. 8 and 9 illustrate an embodiment of hole indicator means 62 comprised of a large circular piece of transparent rigid sheet material 63, to the underside of which there is attached, in a manner to preserve transparency, a smaller circular piece of transparent rigid sheet material 64 containing cross-like indicia 65. The diameter of smaller circular piece 64 is selected so as to closely fit the interior of aperture 19 of base member 10 and the width of elongated slot 55 of the anchoring means of FIG. 5. In use, one of said hole indicator means may be placed over aperture 61 of anchor means 16, and rotated until the cross-like indicia matches with similar indicia marked on the workpiece by a stencil. The same or a second hole indicator may be slid along the top of elongated slot 55 and rotated to match with a second site marked on a workpiece. After the positioning of anchor means 16 is determined by the hole indicator means, said anchor means is clamped in place at attachment means such as tabs 50. Base member 10, carrying the drill assembly is then placed in position on said anchor means by the insertion of the protuberances of said base member into the matching openings of said anchor means. Such manner of use assures precision drilling of not only a single isolated hole, but further assures the placement of other holes in exactly desired location with respect to the first hole.

The hole indicator means 62 may in certain embodiments be provided with measuring indicia such as a checkerboard pattern of two parallel arrays of perpendicularly intersecting lines, or two perpendicularly crossed axes with distances marked thereon, or lines radially emanating from a center point at marked angles, or other equivalent measuring indicia. In still other embodiments, the hole indicator means may function as a stencil, permitting marking of the workpiece. When used as a stencil, the indicator means will be designed to fit in recessed manner within aperture 61 or slot 55, whereby it rests in contact with the workpiece.

In operation, an appropriate drill bit is inserted into chuck 15, the position of carriage 13 is adjusted along upper tube 26, base member 10 is engaged with anchoring means 16 after selecting the desired location for the hole in the workpiece in the aforedescribed manner, and the angle of the hole is set by appropriate pivotal movement of columns 11, if necessary. The chuck of a hand-held electric drill is attached to spindle 14, the drill is activated and pressed downward until stopped by depth stop means 44. When the hole is drilled, and downward pressure is removed from the drill, said drill returns to its original position. If, for some special application, it is not desired to utilize the anchoring means, the protuberances may be removed from the lower surface of base member 10, or an adapter plate may be employed having openings to accommodate the protuberances. In either of such expedients, the base member 10 is effectively provided with a completely flat surface. It should also be noted that, because the columns descend along with the drill, the apparatus can accommodate a hand drill such as a brace having a horizontally disposed crank arm.

The various structural and functional components of the apparatus of this invention are preferably fabricated of strong and durable metal or plastic materials by molding or machining which will afford a highly sevicible, low cost product.

Figure 10:
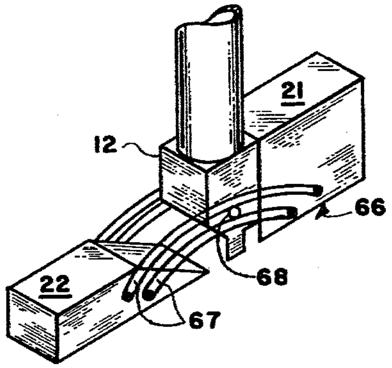
FIG. 10 is a fragmentary perspective view of pedestal means of the embodiment of FIG. 1 provided with means for locking said pedestals in desired angular positions.

The embodiment of FIG. 10 shows the use of angle locking means 66 comprised of a pair of uniformly spaced arcuate metal bands 67 on each side of pedestal 12 bridging abutment means 21 and 22 and attached thereto. A bolt 68 passes through pedestal 12 and engages with a threaded nut on the opposite side of said pedestal. Both the head of bolt 68 and the engaging nut bear against the outer surfaces of arcuate bands 67. When tightened, bolt 68 causes pedestal 12 to become locked in a position between 45° and 90° with respect to the base member. Holes drilled with the apparatus in a chosen angle will have the same angle with respect to the top surface of the workpiece.

While particular examples of the present invention have been shown and described, it is apparent that changes and modifications may be made herein without departing from the invention in its broadest aspects. The aim of the appended claims, therefore, is to cover all such changes and modifications as fall within the true spirit and scope of the invention.

What is claimed is:

1. An apparatus adapted for use with a hand-held electric drill comprising:

a. a base member having a central aperture, a flat underside having downwardly directed protuberances symmetrically spaced about said aperture, and an upper surface having spaced paired abutment means, b. two parallel columns, having bottoms which are in pivotal engagement with said base member at sites diametrically spaced about said central aperture, each column being comprised of an upper cylindrical tube, a lower cylindrical tube which engages said upper tube in telescoping manner, and a coil spring confined within said engaged tubes and adapted to generate a resistive force when the upper tube is downly urged upon the lower tube, c. a carriage in slideably adjustable engagement with said upper tubes, having a spindle centered between said columns and parallel thereto, the lower portion of said spindle supporting an adjustable chuck and the upper portion of said spindle being shaped to be gripped by an adjustable chuck, and d. anchoring means having a flat upper surface and openings in said surface adapted to receive in close-fitting engagement the protuberances of said base member, a mating aperture positioned and dimensioned such that, when said anchoring means is engaged with said base member, the central apertures of both components are in substantially congruent relationship, and attachment means whereby said anchoring means may be adjustably fastened to an underlying workpiece.

2. The apparatus of claim 1 including hole indicator means removeably associated with said mating aperture.

3. The apparatus of claim 2 wherein said hole indicator means is rotatably positionable within said mating aperture.

4. The apparatus of claim 2 wherein said hole indicator means is adapted to function as a stencil in a manner to permit controlled marking of an underlying workpiece.

5. The apparatus of claim 1 wherein said anchoring means contains an elongated slot spaced from said mating aperture and adapted to adjustably position hole indicator means.

6. The apparatus of claim 1 having depth stop means associated with said carriage.

7. The apparatus of claim 1 wherein the pivotal engagement of said parallel columns with said base member is achieved by the provision of a pair of pedestals upon which the bottoms of said columns are mounted, said pedestals pivotably engaging said base member at sites diametrically spaced about said central aperture and having flat surfaces adapted to meet with the upper surface of said base member and with said abutment means.

* * * * *